United States Patent
Sumner

Patent Number: 6,155,305
Date of Patent: *Dec. 5, 2000

[54] OFFSHORE PIPELINE WITH WATERPROOF THERMAL INSULATION

[76] Inventor: Glen R. Sumner, 8306 Leafy La., Houston, Tex. 77055

[*] Notice: This patent is subject to a terminal disclaimer.

[21] Appl. No.: 08/394,184

[22] Filed: Feb. 24, 1995

Related U.S. Application Data

[63] Continuation-in-part of application No. 08/297,059, Aug. 29, 1994, abandoned.

[51] Int. Cl.$^7$ .................................................. F16L 9/14
[52] U.S. Cl. ........................ 138/149; 138/140; 138/141; 405/157
[58] Field of Search ..................... 138/149, 156, 138/145, 146, 140, 137, 141; 405/157, 155, 158

[56] References Cited

U.S. PATENT DOCUMENTS

| | | | |
|---|---|---|---|
| 1,179,374 | 4/1916 | Many | 138/119 |
| 2,824,022 | 2/1958 | Sucetti | 264/43 X |
| 3,706,872 | 12/1972 | Trabilcy | 219/300 |
| 3,742,985 | 7/1973 | Rubenstein | 138/141 |
| 3,782,985 | 1/1974 | Gebhardt | 106/97 |
| 3,799,208 | 3/1974 | Ells | 138/175 |
| 3,903,706 | 9/1975 | Gzemski | 61/50 |
| 3,939,874 | 2/1976 | Gray | 138/145 |
| 4,014,370 | 3/1977 | McNulty | 138/144 |
| 4,106,528 | 8/1978 | Laing | 138/149 |
| 4,114,657 | 9/1978 | Laugenfeld | 138/109 |
| 4,151,003 | 4/1979 | Smith et al. | 106/278 |
| 4,231,884 | 11/1980 | Dorius | 252/62 |
| 4,289,172 | 9/1981 | Ekstrom | 138/149 |
| 4,374,687 | 2/1983 | Yamamoto | 156/71 |
| 4,384,896 | 5/1983 | Aitcin et al. | 106/288 |
| 4,399,319 | 8/1983 | Zinn | 138/114 |
| 4,420,524 | 12/1983 | Gorgati | 428/110 |
| 4,449,852 | 5/1984 | Muszynski | 405/168 |
| 4,504,320 | 3/1985 | Rizer et al. | 106/98 |
| 4,524,156 | 6/1985 | Cogliano | 521/83 |
| 4,721,410 | 1/1988 | Recalde | 405/166 |
| 4,822,422 | 4/1989 | Sugama | 106/97 |
| 4,963,420 | 10/1990 | Jarrin et al. | 428/36.9 |
| 5,020,481 | 6/1991 | Nelson | 122/494 |
| 5,120,381 | 6/1992 | Nee | 156/187 |
| 5,192,039 | 3/1993 | Williams | 248/62 |
| 5,271,974 | 12/1993 | Upchurch | 428/34.4 |
| 5,462,091 | 10/1995 | Saupe | 138/126 |
| 5,476,343 | 12/1995 | Sumner | 405/157 |

FOREIGN PATENT DOCUMENTS

| | | |
|---|---|---|
| 0 521 582 A1 | 1/1993 | European Pat. Off. . |
| 26 30 459 A1 | 12/1978 | Germany . |
| 29 13 611 A1 | 1/1980 | Germany . |
| 367387 | 3/1932 | United Kingdom . |
| 811714 | 10/1959 | United Kingdom . |
| 2 247 507 | 3/1992 | United Kingdom . |

OTHER PUBLICATIONS

Rhuplex DP–2605 A100% Acrylic Dry Polymer Cement Modifier, Rohm & Haas 1991.

*Primary Examiner*—Patrick F. Brinson
*Attorney, Agent, or Firm*—Frohwitter Law Firm

[57] ABSTRACT

An improved, cost effective, insulated pipeline suitable for use in water or below grade, that is insulated with a bituminous composition unmodified or modified with filler, extenders or other materials or structures to improve the dimensional stability of the bituminous composition.

28 Claims, 8 Drawing Sheets

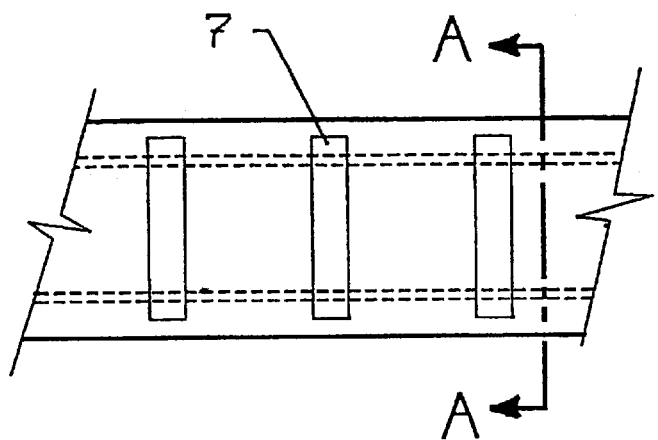
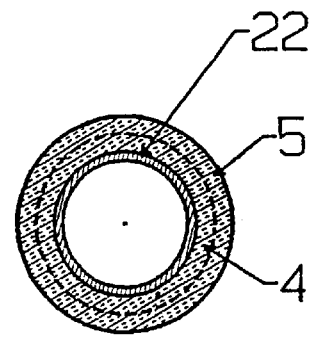
FIGURE 4
FIGURE 5
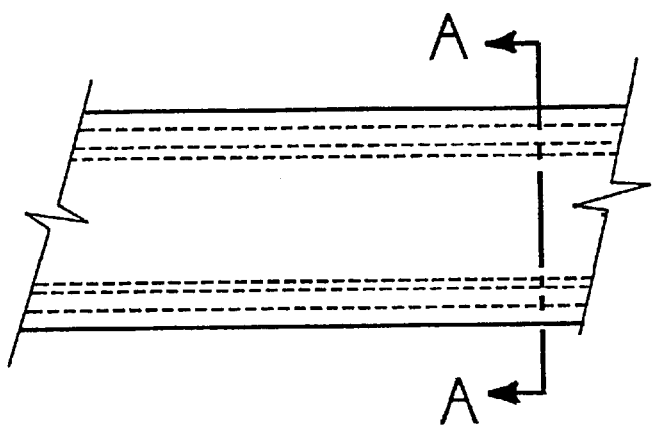
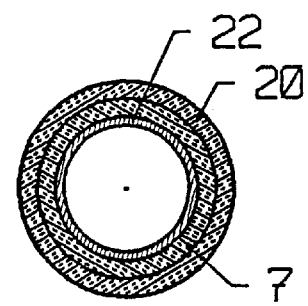
FIGURE 6
FIGURE 7

OFFSHORE PIPELINE WITH WATERPROOF THERMAL INSULATION

This application is a continuation-in-part of my earlier patent application Ser. No. 08/297,059 filed Aug. 29, 1994 now abandoned.

BACKGROUND OF THE INVENTION

1. Field of the Invention

This invention relates to insulated pipelines, pipeline insulating materials which utilize a bituminous component and particularly to a more cost effective, insulated offshore pipeline.

2. Related Art

At low temperatures, the flow through pipelines can be impeded by high viscosity and wax formation in liquid products such as oil, and by hydrate formation in products such as natural gas. These problems can be reduced by using thermally insulated pipelines, but insulated pipelines are expensive on land and ever more costly offshore. For offshore pipelines it has usually been more cost effective to reduce the need for insulation by injecting various chemicals into the product. Recently, however, more and more oil and gas is being produced in deeper, colder water, from sub-sea production systems where use of viscosity reducing chemicals requires a dedicated line to transport them to the wellhead. This, combined with the fact that the cost of insulating pipelines typically increases with depth, means that insulated pipelines are most expensive where the alternatives are least attractive.

Various materials have been used to insulate land pipelines, including expanded cork, polymer foams, calcium silicate and others. Insulating pipelines offshore is somewhat more complicated because most insulating materials can become saturated in water when submerged. Some insulating materials incorporate watertight closed cell structures, but all have some depth limit at which the cellular structure will collapse, and most will fail in a few hundred feet of water. Furthermore, most common insulating materials have little resistance to impact, abrasion or crushing, and must therefore be encased. If the water depth exceeds the hydrostatic pressure limitations of the material then the casing must also isolate the insulating material from the hydrostatic head of the water.

If the pipeline is laid in sections it is a practical necessity to prefabricate each individual pipe section as an independent pressure vessel. Because pressure resistant double pipes are too stiff to spool, several reel-laid pipelines have been installed with flexible coatings of solid, elastomers or elastomers filled and extended with other lightweight materials. Examples include neoprene and EPDM rubber, EPDM and polyurethane elastomers filled with glass microspheres, and ebonite filled with cork. Unless the insulation requirement is minimal, the total cost of pipelines insulated in this manner is even higher than one which uses a pressure resistant casing to protect less expensive insulating materials.

The thermal resistance offered by paint and corrosion coatings is slight due to the fact that the corrosion coatings are generally thin. Bituminous coatings are commonly used for corrosion coatings for offshore pipelines. "Coat and wrap" coatings comprise two or three layers of kraft paper, felt or fiber glass, that are wrapped onto the pipe as they are being impregnated with hot asphalt or coal tar bitumen that is extended with finely divided mineral fillers such as fly ash, finely divided silica, slate flour or calcium carbonate. These coatings are 0.90 to 0.250 inches thick. "Pipeline mastic" coatings are thicker layers of asphalt concrete extruded onto the pipe. Pipeline mastic comprises calcium carbonate, sand, gravel, fiber glass and asphalt, and is ½ to ¾ inch thick. In both types of coatings the fillers reduce cost and build viscosity, but the effective thermal conductivity of these fillers is five to ten times that of pure bitumen, and they therefore substantially increase the conductivity of the composition. The thermal conductivity of mastic coatings, for example, is 3.5 to 4 times that of pure bitumen. The thermal conductivity of "coat and wrap" coatings is somewhat lower, depending on the fabric wrap, but they are so thin that they provide less insulating value than the naturally occurring phenomenon of "self burial" of the pipeline due to scour and currents.

SUMMARY OF THE INVENTION

This invention is directed to a waterproof insulating composition, a cost effective insulated pipeline, and an insulating laminate composition comprising a suitable substrate to which said composition is applied. Such compositions exhibit many of the same properties as rubber or plastic insulating materials known in the prior art for insulating offshore pipelines, yet they are much less expensive. The insulating material comprises two essential characteristics: (1) it is substantially based on a bituminous material such as coal tar or asphalt, and (2) the bitumen itself is either dimensionally stable while supporting the weight of the pipe on the sea bed in the operating temperature range without modification, or there is a means for preventing the pipe from moving through or relative to the bituminous composition.

The means for enhancing dimensional stability can be a mechanical restraint, or a modifier to the bitumen itself. For the purpose of this disclosure, a modifier is considered to be any additive to the bitumen that is not itself a bitumen, including materials that react with the bitumen, materials that form a continuous phase network with the bitumen, or fillers that are mostly inert but more dimensionally stable than the bitumen itself over the operating temperature range of the pipeline. The term filler as used here refers to finely divided materials other than the asphaltines and other components that have been characterized as a colloidal suspension, but which are considered to be elements of the bitumen itself.

Fillers may be polymeric, elastomeric or cellular materials. Inert fillers may take the form of particles or fibers. The filler may be an open-cell material, such as volcanic aggregates or diatomaceous earth, that has porosity that is fine enough that the molten bituminous binder does not completely fill the voids when filler is mixed into it. It can be a closed-cell material, such as perlite, fly ash cenospheres, glass microspheres; it can be cellular plant materials like wood chips or bagasse; or it can be tubular materials such as reeds, rush, bamboo or pieces of plastic tubing.

Briefly the principal aspect of the invention is a pipeline with bitumen laminated onto the outside or inside surface of the pipe wall, wherein said bitumen is not stabilized or extended with fillers. In a particular embodiment the pipeline has a bituminous composition laminated onto the outside or inside surface of the pipe wall, said composition containing no filler, extenders or modifiers that have an effective thermal conductivity that is more twice as high as the thermal conductivity of the bitumen itself and preferably no more than 50% higher than the conductivity of the bitumen. A preferred embodiment is pipeline with a bituminous composition laminated onto a surface thereof wherein said composition comprises particulate fillers to enhance the dimensional stability of bitumen at the operating temperatures and loads imposed by the pipeline, said fillers having an effective thermal conductivity that is less than 0.24 BTU-ft/hr-ft$^2$-°F.

In one embodiment, a pipeline is coated with multiple layers of fabric impregnated and covered with a bituminous composition laminated onto the surface thereof, wherein any additives other than bitumen are included in a quantity and have thermal conductivity such that the thermal conductivity of the composition is no more than 0.12 BTU-ft/hr-ft$^2$-°F. Preferably the multiple layers of fabric impregnated and covered with multiple layers of a bituminous composition wherein the total thickness of said multiple layers is at least 9 mm.

BRIEF DESCRIPTION OF THE DRAWINGS

FIGS. 4 and 5 show cross sections of a pipeline wherein supports are embedded inside an insulating composition to connect the cooler layers of the insulating composition to the pipe to prevent the pipe from moving through the insulating composition.

FIGS. 6 and 7 show cross sections of a pipeline wherein an insulating composition adjacent to the pipe acts as to connect the cooler outer layers of a different insulating composition.

DETAILED DESCRIPTION OF THE PREFERRED EMBODIMENTS

Figure 2:
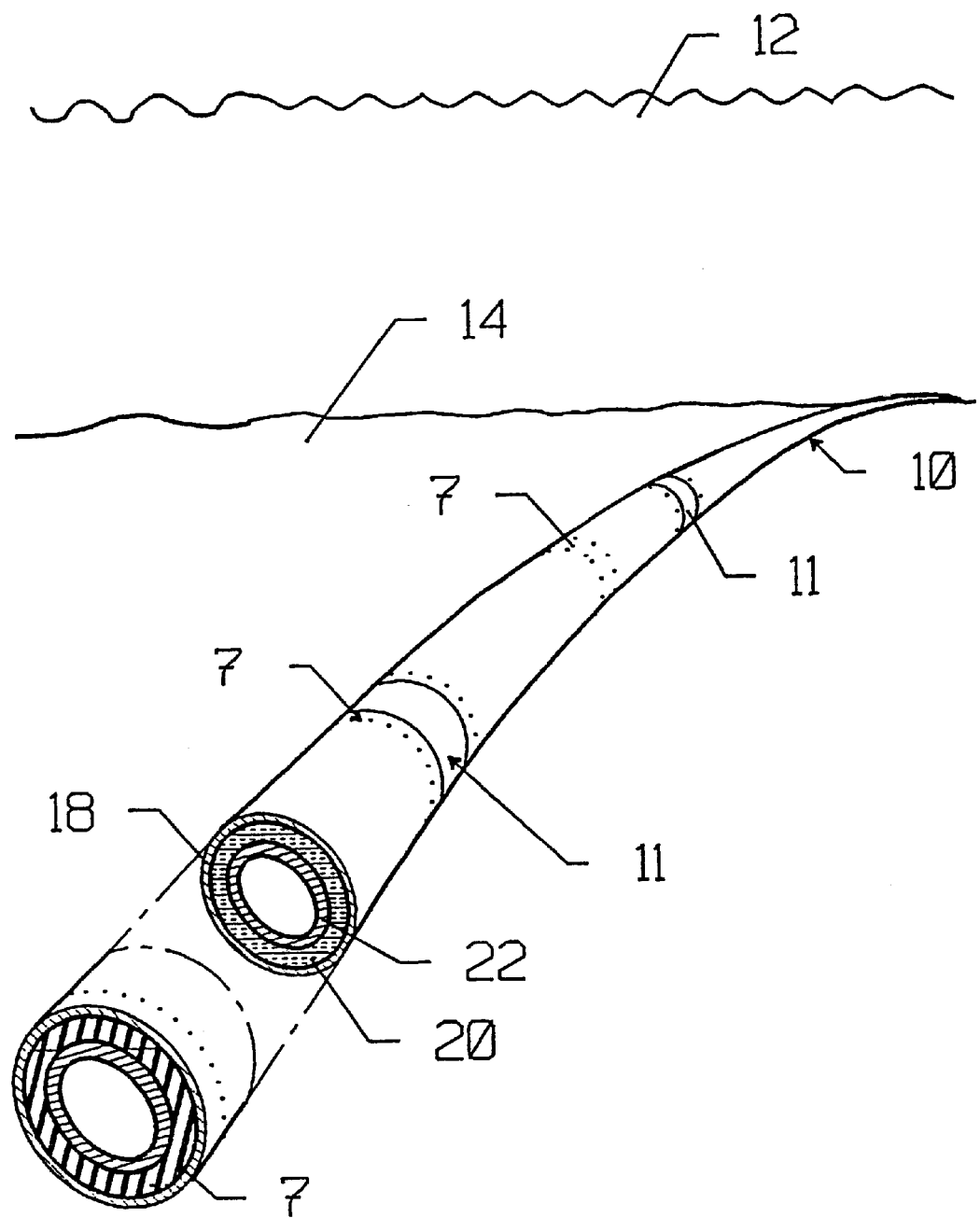
FIG. 2 shows a cross section of a pipeline wherein an insulating coating is laminated between the pipe and a sleeve that is larger than the pipeline, said sleeve being mechanically connected to the pipeline to prevent the pipe from moving relative to the sleeve.
Figure 3:
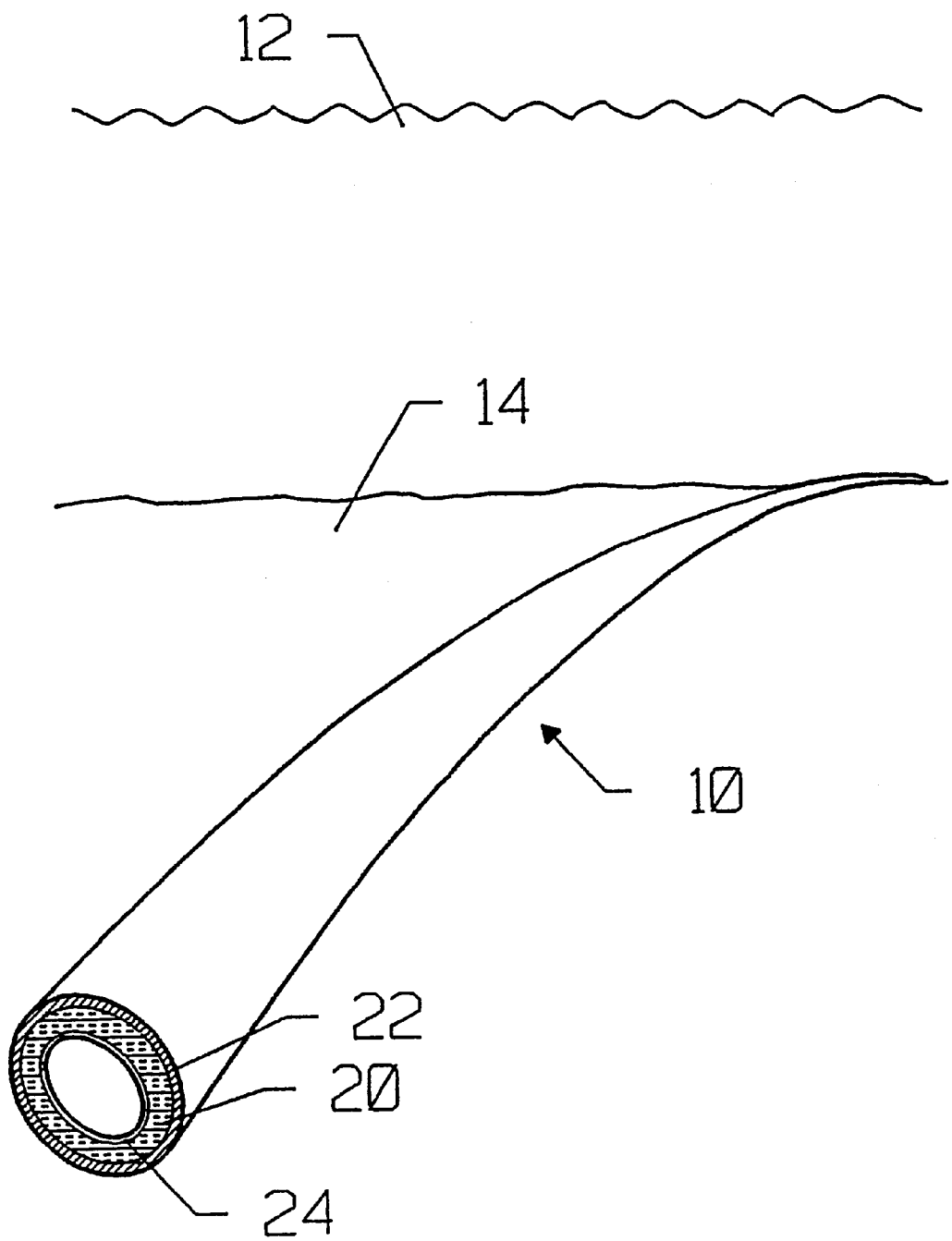
FIG. 3 shows a cross section of a pipeline where the insulating layer is laminated between the line pipe and a sleeve that is smaller than the inside diameter of the line pipe.

The present invention is directed to a cost effective offshore pipeline insulated with a composition comprising a bituminous binder material. Such composition maintains low thermal conductivity when submerged, and can be somewhat flexible, thus being useful for insulating underwater pipelines. The main drawback of bituminous materials for insulating pipelines is the wide variation in mechanical properties with temperature that occurs in ambient temperature ranges. Most offshore pipelines that have been insulated to date have been insulated to keep the product warm. Typical temperatures for produced crude or gas will be in the range from 120 degrees F. to 200 degrees F., although wellhead temperatures can exceed 300 degrees F. At these temperatures some bituminous substances will be molten, and most will be subject to substantial creep, or if not they will probably be brittle at ambient temperature. If a warm, submerged pipeline were coated with a thick coating of a bituminous substance, the center would be much softer than the outside. Over time, the pipeline would sink under its own weight into the soft portion, eventually exposing the bottom of the pipeline. Preventing this is a subject of this invention. This can be reduced by refinements to the composition, as will be described later, or by more direct mechanical means. The most direct mechanical means, is to laminate the coating between the line pipe and a sleeve that is mechanically connected to the line pipe. FIG. 2 and FIG. 3 illustrate a sleeve connected with rings spaced along the length of the pipe. The mechanical connection can be any mechanical spacer that can support the required loads, including be a raised spiral, longitudinal strips. Because the insulating composition is waterproof under high hydrostatic pressure, the sleeve need not be sealed, and need not be independently collapse resistant as it would with insulating materials that do not have high compressive strength. For this reason, the sleeve can be made of thin, inexpensive material. Furthermore it need not be continuous across the field joint in the pipeline, thus eliminating one of the most difficult problems with encased insulation designs. The most interesting and efficient sleeve is deceptively simple. It is the cool outer stratum of the insulating composition itself. The mechanical connection is embedded in the coating and connects this layer to the pipe. The sleeve may be comprised of a cool stratum of said insulating composition that is mechanically stable enough that said mechanical means can react against it to contain a warmer stratum and prevent said pipeline from moving through said warmer stratum for long periods of time. The mechanical means for connecting said sleeve to said pipeline may comprise a plurality of insulating layers of different compositions that are applied in layers at least 3 mm thick, the first layer being around and adjacent to said pipe. This is illustrated in FIG. 4 where the mechanical connections are rings spaced along the length of the pipeline. Sea water temperature will usually be below 80 degrees F., and temperatures this high will only occur near the surface. It is possible to formulate pure bitumen that will not creep much at this temperature.

If a more dimensionally stable material is embedded in the insulating composition at points along the length of a hot pipeline, it will react against the cool layers to keep the pipe from moving. The primary requirement for this means of mechanically connecting the cool layer to the pipe is that it must be a good enough insulator that it does not transmit too much heat to the cooler layers of the insulating composition. One of the benefits of this arrangement is the fact that the mechanical supports can be entirely encapsulated in the waterproof bituminous insulating composition, and therefore need not be waterproof. In FIG. 6 the mechanical connection 7 could, therefore, be wood strips or parquetry.

Figure 9:
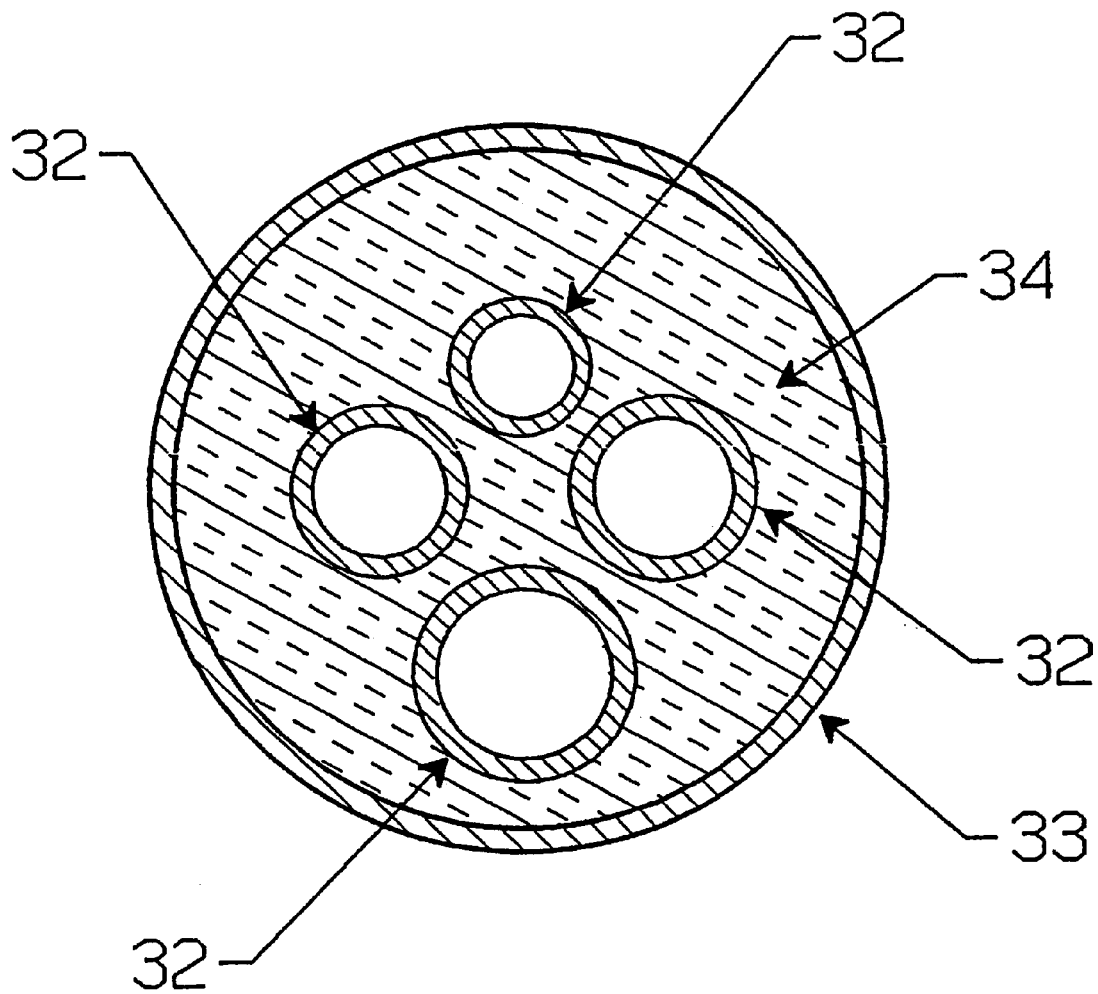
FIG. 9 shows a cross section of several flow lines bundled inside a floatation pipe, typical of arrangements used in the controlled depth tow method of installing multiple pipelines.

The geometrically simplest connection is illustrated in FIG. 5, and is simply a layer 7 of a different insulating material that has adequate compressive strength and structural stability, such as aerated cement, bagasse and cement, or other traditional insulating materials. Unlike a pipeline where a bituminous coating serves only to waterproof an insulating layer, the coating of this invention is formulated and applied to contribute substantially to the thermal resistance of the composite. For pipelines that operate on land this distinction may appear to be academic, since conventional pipe insulating materials are far better insulators than bitumen, but these conventional materials do not have the compressive strength to resist deep sea pressure, even if they are kept dry. There is, however, another important feature of this arrangement that is not readily apparent. When pipe is laid offshore, time is at a high premium, so insulation is applied before the pipe is sent to the job site, except on a short stub that is left for joining the pipes. After the pipes are welded together, the field joint must be insulated. Several manufacturers insulate line pipe with polyurethane foam that is kept dry with a thin polyethylene jacket. This is normally used for land pipelines which are often buried, and even under the pressure of ground water, the field joints often leak. A persistent problem results from the fact that it is difficult to seal the end of the jacketed foam, since it is not easy to seal against polyethylene that is not solidly backed up. Most other polymers are more permeable or more expensive. Bitumen is very impermeable to water and costs less, so a much thicker layer costs the same, increases the thermal resistance, and is much easier to seal because it adheres easily to itself and many other materials. It is quick and easy to form a cavity into which hot bitumen can be poured by wrapping sheet metal around the joint as shown in FIG. 9. The bitumen fuses to the outside layer on the main insulation, leaving a continuous, insulating, waterproof jacket, and the bitumen in the field joint also acts as a barrier to the propagation of water from the insulation on one pipe joint to the insulation on another pipe joint. To appreciate this it is useful to list all the properties and features of bitumen that are important in this application, including 1) very low permeability, 2) low cost, 3) can be poured, 4) cures quickly, 5) adheres seamlessly to itself, 6) bonds to the pipe or corrosion coating, 7) has low thermal conductivity, 8) is tough enough not to be easily punctured, but flexible enough not to crack, 9) is non toxic, 10) is widely available. These properties have never all been exploited simultaneously in this way. There are other thermoplastics that can be substituted for the bitumen and some may be tougher but will also cost more. This additional cost could, in some cases, be offset by applying an inside layer of less expensive, perhaps porous insulating material, similar to that used on the preinsulated part of the pipe.

If the purpose of the insulation is to keep the contents of the pipeline colder than ambient, then no independent means for preventing the pipe from moving through the insulating coating is necessary, and fillers would serve only to reduce the cost or thermal conductivity of the bituminous material.

For the purpose of this disclosure the term bitumen is meant to describe a class of black or dark colored, solid, semisolid, or viscous, cementitious substances, natural, or manufactured, composed principally of high molecular weight hydrocarbons, of which asphalts, tars including coal tar, pitches, and asphaltites are typical. The terms bituminous material, or bituminous composition are meant to include materials that are substantially based on bitumen from one or more sources or types. Most commercial asphalt that is used in large quantities is extracted from petroleum. It is inexpensive but soft at moderate temperatures. Various techniques for reducing creep have been used in other applications.

Blowing air through asphalt causes oxidation that increases the softening point but also elevates the temperature at which the asphalt becomes brittle. Asphaltites are naturally occurring bitumen that has oxidized through natural weathering. Asphaltites contain varying amounts of impurities, but some types, such as Gilsonite, are mostly pure hydrocarbon with only very small amounts of impurities. They have high softening temperatures but can be less brittle at low temperature than oxidized petroleum asphalt. Asphaltites can be mixed with asphalt to maintain dimensional stability without brittleness over a wider temperature range but the more pronounced effect of oxidation or weathering is to raise both the softening temperature as well as the temperature at which the bitumen becomes brittle. This does not result in large changes in the thermal conductivity, and can therefore be a useful way to adjust the properties of the bitumen to suit the operating temperature of the pipeline.

In pipelines that are operating at temperatures greatly different from ambient, it may be desirable to use several layers of different formulations that have mechanical properties that are different at the same temperature, but similar at the temperature at which they will operate. In such an arrangement, a layer that is formulated so that it is not brittle at ambient temperature, but which would be soft at the pipeline operating temperature, could be applied over a formulation that would be brittle at ambient temperature. This case is illustrated in FIG. 5, wherein the mechanically stable layer 4 that is adjacent to the pipe is slightly different from the outer stratum, but where both strata are bituminous materials.

Various polymeric modifiers also known to extend the range of temperatures over which dimensional stability exists by chemically reacting with the bitumen, while others behave as a second continuous phase that forms a network, or has an affinity with the bituminous component These include styrene-butadiene-dyene (SBS rubber) styrene-ethylene/butylene-styrene, ethylene vinyl acetate, neoprene latex, and other elastomeric materials. In the research that was done investigating various modifiers, it was found that certain types of hot melt epoxy can also be effective. Like most elastomeric polymers, these modifiers generally have low thermal conductivity compared to most solids and are therefore well suited to modifying bitumen for insulating offshore pipelines. These materials are combined in proportions suitable to the operating temperature of the pipeline.

Some polymeric modifiers are finely divided particles such as crumb rubber or polyolefins. These materials behave more like fillers than as a second continuous phase, but unlike mineral fillers, their elastomeric properties also increase the flexibility of asphalt at low temperature. The thermal conductivity of these elastomeric materials is much lower than the solid minerals fillers typically used to extend bitumen. These modifiers, which are high cost materials compared to bitumen, are generally used in small quantities, e.g. 2–15 wt. %, and the major insulating component remains the bitumen.

Sulphur and carbon black are also known to increase the softening point of bitumen and do not greatly increase the thermal conductivity if used in moderate amounts.

It has now been discovered that when fillers that entrap void, or gas filled spaces are added to a bituminous binder, the collapse resistance of the filler can be enhanced, and that the fillers themselves add body and reduce creep, while at the same time reducing the thermal conductivity. Open-cell fillers as well as closed-cell fillers can have this effect. Materials whose cellular structure is derived from plant matter such as wood, cellulose, jute, or bagasse, combine low cost and low thermal conductivity. Despite the fact that bitumen softens at higher temperature, fillers with fine porosity do not necessarily become saturated when mixed into the molten bitumen, and are surprisingly resistant to becoming saturated with bituminous material or with water when the composition is subjected to hydrostatic pressure.

Furthermore, the added insulation increases the temperature gradient thus reducing the softened thickness that is subject to creep. Finally, the thermal conductivity of bitumen is quite low compared to most non-porous solid, or semi-solid materials, so that even if the bituminous material penetrates the filler in the hot stratum, there is still enough temperature gradient to limit this penetration to the hot stratum, and the benefit of reducing sag or creep is not affected. In short, porous fillers can reduce creep of bituminous substances, and the bituminous substances can effectively block water absorption in porous fillers for long periods of time under hydrostatic pressure. For pipelines that are insulated to keep the contents cool, or at only slightly elevated temperature, the effect of fillers combined with techniques for raising or lowering the softening point may eliminate any need for independent means of preventing creep.

A filler made up of hollow spheres has the advantages that the ratio of volume of surface area to space is minimized, and that the spherical shape is very resistant to collapse. For pipelines in deep water, the filler will preferably be a closed-cell, pressure-resistant material, and for very deep water a spherical filler such as fly ash cenospheres can maximize collapse resistance. The thermal conductivity of the composition will depend on the ratio of filler to binder. The thermal conductivity of the filler will preferably be less than the thermal conductivity of the bituminous material so that it will lower the thermal conductivity of the composition. It follows that the thermal conductivity of the composition will be lower when the fraction of filler is higher, and the maximum amount of filler depends on the geometry of the filler. In deeper water, however, cellular fillers with conductivity lower than bitumen that will withstand this pressure without dimensional creep may be costly or non-existent. In those cases, cellular fillers with conductivity slightly higher than the bitumen can be selected based on the best combination of low cost and low thermal conductivity using the minimum amount of filler needed to achieve dimensional stability. In some cases the true thermal conductivity of the filler itself may not be known. For some materials, particularly fibrous materials, reported thermal conductivity is based on measurements of a loose fill. This is actually the thermal conductivity of a composition of air and particles, not the particles themselves. For the purpose of this disclosure, the term effective thermal conductivity will be used to characterize the true thermal conductivity of particles or fibers based on their effect in a composition. This value may, in fact, only be indirectly determinable using verified mathematical models for inferring the thermal conductivity of a dispersed phase based on the measured conductivity a continuous phase and a composition of the continuous phase and the dispersed phase.

The filler to binder ratio can be optimized by various methods. As an example, two sizes of spherical fillers such as glass microspheres can be made to occupy a larger fraction of the total volume than one. Generally, production of microspheres results in a dispersion of sizes but packing density can be improved by using sieves to grade them into several size ranges. The practical maximum amount of filler will be determined by experiment. Typically, without size grading, microspheres can occupy 40 to 60 percent of the total volume. Using a combination of very fine fillers and a larger aggregate can further increase the amount of space occupied by the fillers. A typical mixture that is made by stirring the binder into molten asphalt could have a filler to binder ratio of up to 0.75. There are also other practical considerations. When a very high filler-to-binder ratio is used, the composition becomes a stiff mastic that may be difficult to apply. Cylindrical fillers, such as grasses, or plastic tubing can also be used alone or in conjunction with porous or closed cell fillers previously described, where the term grasses includes reeds, rush, and bamboo. The term filler is construed broadly to include larger tubes such as bamboo or plastic tubing that are laid parallel to the axis of the pipe. The material in the interstices may, itself, be a combination of a bituminous material and a finer filler. The tubes may be laid onto the pipe before or while the other components of the insulating composition are being applied. The resulting cross section is shown in FIG. 7. If the tubular pieces are laid so that they are in contact, they can also be construed as, and serve as a mechanical link between a hot strata in the interstices, and a cooler strata. In this example the functions of the filler and the mechanical connection are identical and the conceptual similarity that exists throughout this disclosure becomes more apparent.

To avoid the need for heating the material, the bitumen can be thinned with solvents, or emulsified in water. The resulting substance can then be cured by allowing the solvents or water to evaporate.

A related composition can be made by adding an emulsion of bituminous material and water to a mixture of cellular fillers and hydraulic cement. The low cost and availability of Portland cement make it attractive, but other types of cement can be used. The cement cures to form a structural material that retains its strength over a wide temperature range, while the bituminous component reduces water absorption and lowers the thermal conductivity compared to binders made entirely of hydraulic cement. In such compositions, using too much bituminous component can inhibit the reaction. Useful limits vary with the amount and type of cellular filler, but the bituminous component will be a relatively small part of the total. Bituminous components of five to ten percent of the weight of cement will significantly reduce water absorption compared to a composition of cement and cellular filler. Larger amounts of bituminous material will further reduce water absorption and thermal conductivity of the composite binder, but will also weaken it. Considerably more cement than bituminous material is needed for it to provide effective structure. This composition eliminates the need for a separate means for preventing creep. In the context of this patent, another way of thinking about this is that it is a composite material wherein the bituminous material is dispersed in the means for preventing the pipe from moving relative to it.

The insulating composition may be applied to pipes (or other substrata) by casting, spraying, depositing a softened mass between two counter-rotating brushes that accelerate the mass to impinge onto the pipe at high velocity, thereby compacting the material causing it to stick together in a thick layer, by extruding or by casting elongated ring segments and bonding or fastening these segments to the pipe. Coating methods disclosed in U.S. Pat. No. 4,721,410, which is incorporated herein in its entirety, may be satisfactorily used to apply the present insulation coatings.

The thickness of the coating will depend on the temperature of the sea water, the pipe dimensions, other coatings that may be present, the temperature, pressure and properties of the material to be transported and the conductivity of the specific cured composition.

Figure 8:
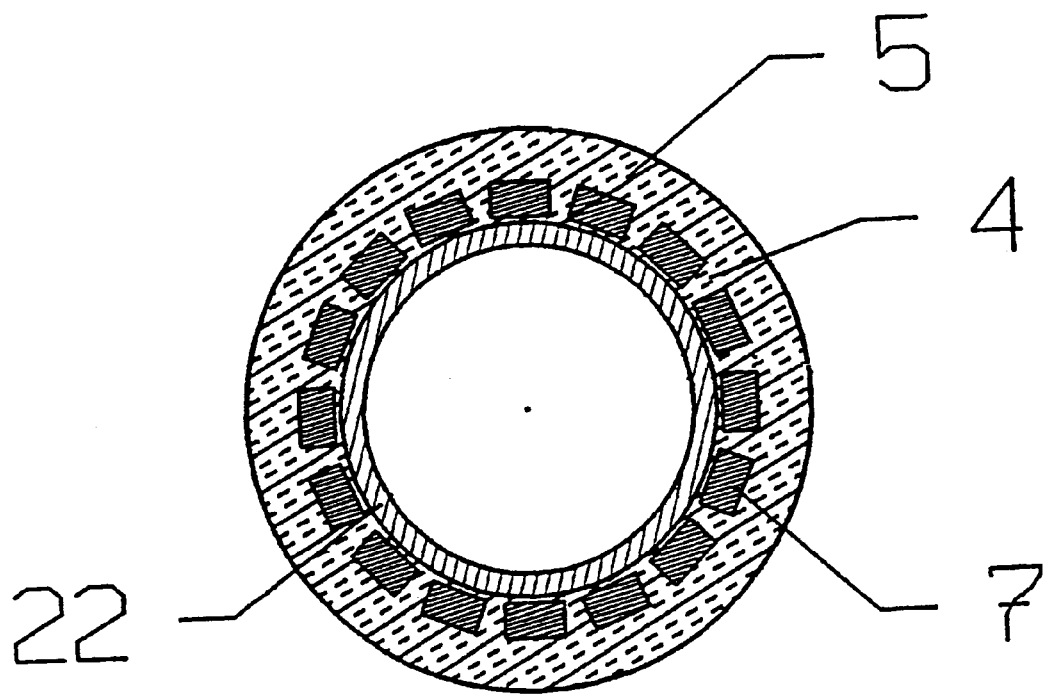
FIG. 8 shows a cross section of a pipeline wherein the bituminous coating is filled with tubular materials that are laid parallel to the axis of the pipe.

Pipeline contractors are increasingly using "the controlled depth tow method" for laying bundles of several small pipelines that carry oil from underwater wellheads to nearby platforms. In this method, several small pipelines are fabricated onshore, inside a larger casing pipe as illustrated in FIG. 8. The casing pipe, 33, is sized to act as a flotation for the pipelines, 32. Techniques for changing ballast are used to keep the overall density of the bundle very near to the density of water so that it can be suspended between tugs at either end while it is towed to its offshore site. Once it arrives at the destination, ballast is added to cause it to sink to the sea bed. The ballast must be heavy enough to cause the bundle to be stable on the sea bed in the presence of prevailing water currents. If insulation is necessary or desirable, then it is desirable that the ballast have low thermal conductivity. In the past, jelled petroleum products have been used. A slurry of bentonite, water and fly ash cenospheres has also been used. In this invention, the small pipelines are insulated with bitumen in the space between them and the casing pipe. It can be pumped in hot and allowed to cure. In another method, pulverized asphaltite is mixed into a slurry of water or oil, and then pumped into the pipeline. It is ideal for this purpose because it has a density very near that of water. Other materials of comparably low conductivity are lighter, and hence would float to the surface and would not add as much ballast. An oil slurry is preferred because the asphaltite will dissolve in the oil to form a tar. Since this process occurs slowly at ambient temperature, it remains pumpable during the installation process, but when the pipelines get hot, the asphaltite quickly dissolves. A similar result can be achieved with bituminous coal instead of asphaltite. The main advantage of asphaltite is that certain types, like Gilsonite, are very pure, and therefore exhibit low thermal conductivity very near to that of pure bitumen. An alternative is to use a mixture of hydraulic cement and asphalt emulsified in surfactants and water. The emulsion remains liquid long enough to pump it into the pipe and then turns to a gel of pudding-like consistency. Preferably, the amount of water in the emulsion is kept to a minimum, since the conductivity of water is higher than that of the bitumen. Similarly, the amount of cement used should be the minimum amount needed to cause the material to jell sufficiently to prevent convection, since the conductivity of most hydraulic cements are higher than the conductivity of water. Experiments related to this invention have shown that an emulsion of six parts asphalt to 3 parts water and surfactants will remain liquid for some time when after it is mixed at the job site with one to two parts Portland cement, but that after 24 hours it takes on the consistency of thick pudding. The thermal conductivity of this cured composition is low enough to be useful in some cases, but not as low as the slurry of Gilsonite and oil.

Figure 1:
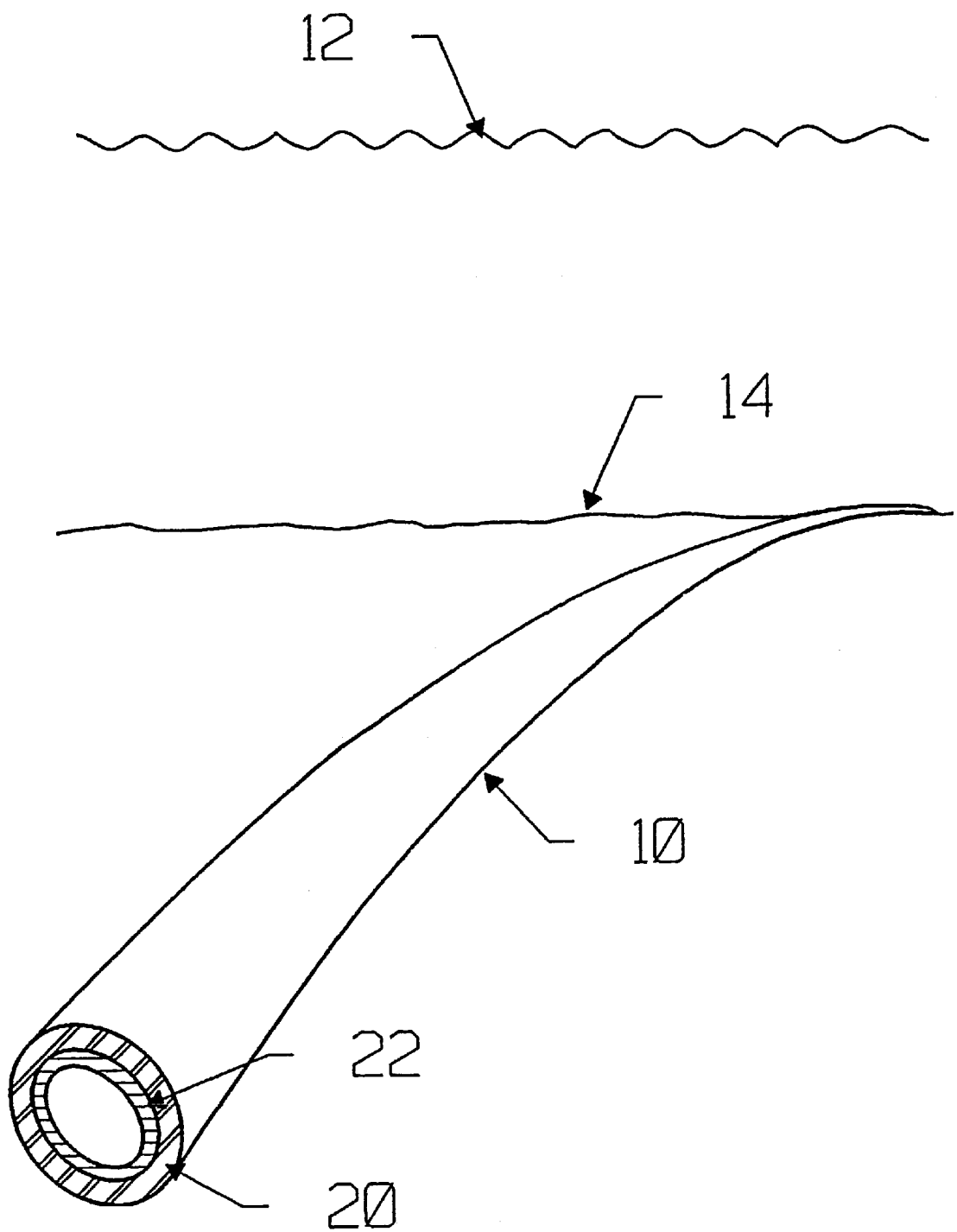
FIG. 1 is an insulated pipeline lying on a marine floor, the end of which is shown as a cross section consisting of a pipe, and an insulating coating.
Figure 10:
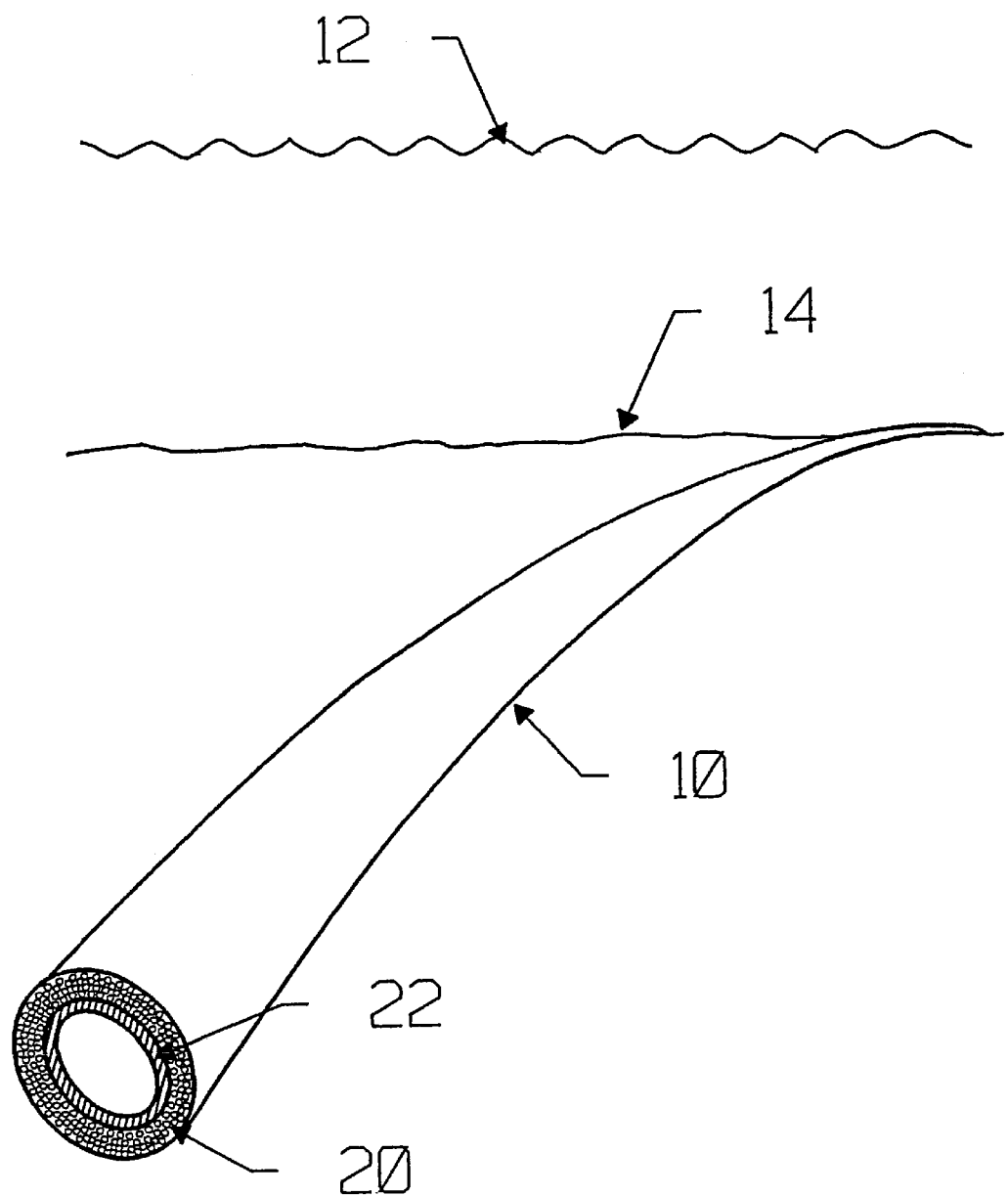
FIG. 10 shows a cross section of a pipeline wherein an array of rectangular supports are embedded inside an insulating composition to prevent the pipe from moving through the hot stratum.

Referring to FIG. 1, a pipeline 10 is shown on the marine floor 14 where 12 is the water level. The pipeline is coated with the insulating composition 20, around the line pipe 22, the pipe being a suitable substrate for the insulating coating. In FIG. 2 a sleeve 24 extends over the line pipe and the insulating material is adhered to both the line pipe 22 and the sleeve 24. The sleeve is connected to the pipe with supports 7 and is not continuous across the field joints. In FIG. 3 the insulating composition 20 is laminated between the pressure containing line pipe 22 and a sleeve 24 of smaller diameter. In FIGS. 4 and 5 the pipe 22 is covered by a layer an insulating composition that comprises two stratum 4 and 5 that may be of slightly different bituminous compositions, or they may be distinguished only by the change in mechanical properties that results from the difference in temperature. The stratum 5 that is furthest from the line pipe 10 is held in a fixed position relative to the pipe 10 by a mechanical connection 7 that is embedded in the stratum 4 that is nearest the line pipe 22. FIGS. 6 and 7 are similar to FIGS. 4 and 5, except that the mechanical connection 7 occupies most or all of the space adjacent to the line pipe 22, thus mostly substituting for the insulating composition, 20 in that space. In FIG. 8, rectangular strips 7 are placed around and adjacent to a pipe 22 and are surrounded by a stratum 4 of an insulating composition. Said rectangular strips connect the pipe 22 to an outer stratum 5 of the insulating composition to keep it in a fixed position relative to said pipe. FIG. 10 shows a pipeline 10 in which the pipe 22 is covered by an insulating composition, 20, that consists of tubular fillers in a bituminous material, where said tubular fillers are aligned parallel to the axis of the pipe 22 FIG. 9 is a cross section of several small flow lines 32 bundled inside a floatation pipe 33 and is typical of arrangements used in the controlled depth tow method of installing multiple lines at once.

Figure 11:
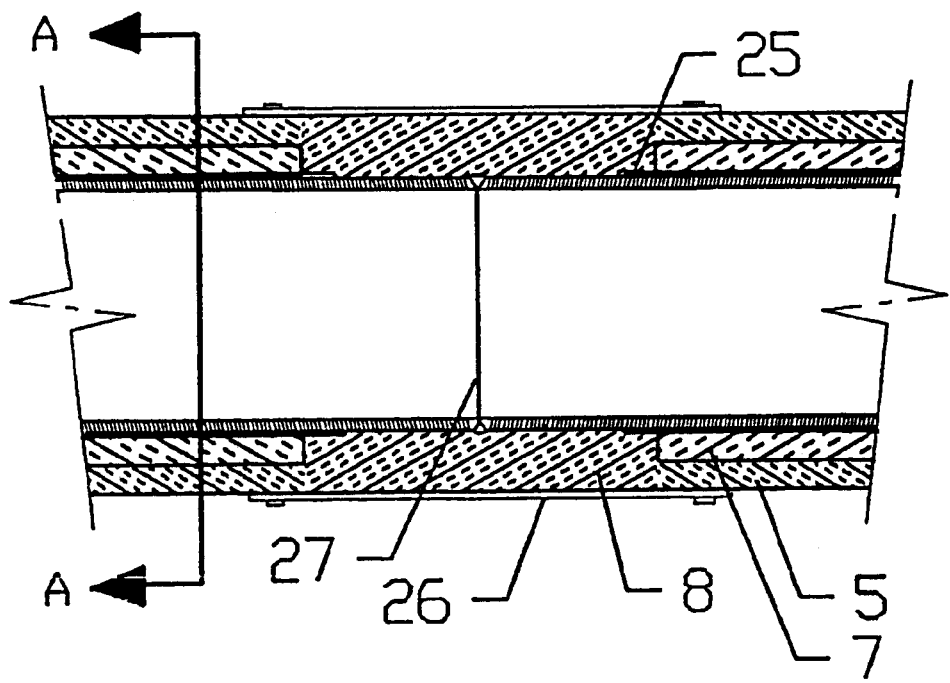
FIGS. 11 and 12 is a field joint on a pipeline that is insulated with a layer of a porous material under a thick, bituminous coating.
Figure 12:
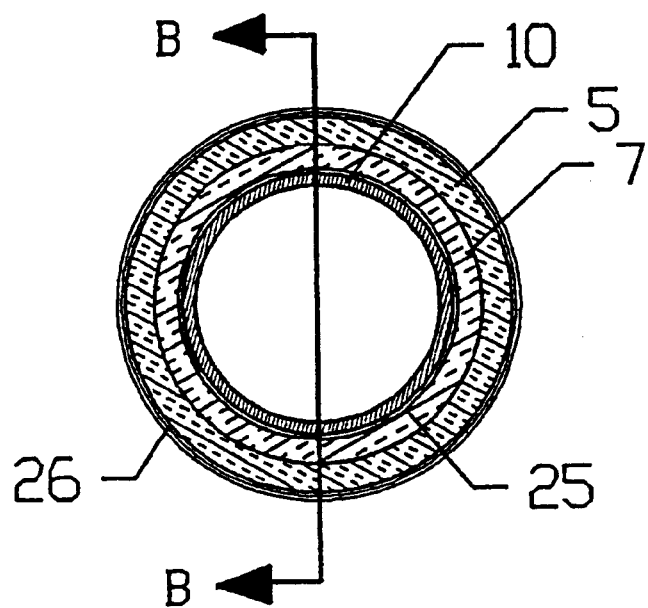

The insulating material 34 also serves as ballast to sink the bundle once it is towed to the final destination. FIGS. 11 and 12 are cross sections of a pipeline at the field joint 27 wherein the most of the length of the pipes 10 are factory coated with a corrosion coating 25 and layer of porous insulating material 7 that supports an outer layer of a bituminous insulating composition 5 and where the area near the field joint 27 wrapped in sheet metal 26 and then filled entirely with a bituminous insulation composition 8 that is the same as or similar to the bituminous insulating composition 5.

The invention claimed is:

1. A submarine pipeline comprising pipe with at least one bituminous composition therearound, wherein at least one of said at least one bituminous composition is a waterproof insulating composition comprising fillers, wherein the fillers have effective thermal conductivity less than 0.24 BTU/hr*ft*°F., and wherein said at least one bituminous composition contributes the main thermal resistance to heat transfer between said pipe and the environment.

2. The pipeline of claim 1 wherein the thickness of said at least one bituminous composition is at least about ¾ inch.

3. A submarine pipeline comprising pipe with at least one bituminous composition therearound, wherein at least one of said at least one bituminous composition is a waterproof insulating composition comprising particulate fillers wherein said fillers have effective thermal conductivity less than 0.24 BTU/hr*ft*°F.

4. A submarine pipeline comprising pipe with at least one bituminous composition therearound, wherein at least one of said at least one bituminous composition is a waterproof insulating composition comprising particulate fillers that enhance the dimensional stability of said composition and wherein said fillers have effective thermal conductivity less than 0.24 BTU/hr*ft*°F. wherein said at least one bituminous composition comprises a fibrous material.

5. The pipeline of claim 4 wherein said fibrous material comprises a polymeric fiber.

6. The pipeline of claim 4 wherein said fibrous material comprises plant fibers.

7. A submarine pipeline comprising pipe with at least one bituminous composition therearound, wherein at least one of said at least one bituminous composition is a waterproof insulating composition comprising particulate fillers that enhance the dimensional stability of said composition and wherein said fillers have effective thermal conductivity less than 0.24 BTU/hr*ft*°F. wherein said fillers comprise elastomeric particles.

8. The pipeline of claim 7 wherein said elastomeric particles comprise crumb rubber.

9. The pipeline of claim 7 wherein said elastomeric particles comprise polyolefin particles.

10. The pipeline of claim 3 wherein said fillers comprise cellular material.

11. The pipeline of claim 10 wherein said cellular filler comprises closed-cell material.

12. The pipeline of claim 11 wherein said closed-cell material comprises fly ash cenospheres.

13. The pipeline of claim 11 wherein said closed-cell material comprises spheres of pearlite.

14. The pipeline of claim 11 wherein said closed-cell material comprises glass microspheres.

15. The pipeline of claim 10 wherein said cellular material comprises a porous or open-cell material.

16. The pipeline of claim 15 wherein said open-cell material comprises volcanic aggregate.

17. The pipeline of claim 10 wherein said cellular material comprises plant matter.

18. The pipeline of claim 10 wherein said cellular material comprises wood particles.

19. The pipeline of claim 17 wherein said plant matter comprises grass.

20. The pipeline of claim 3 wherein said fillers comprise a tubular material.

21. A submarine pipeline comprising pipe with it least one bituminous composition therearound, wherein at least one of said at least one bituminous composition is a waterproof insulating composition having thermal conductivity less than 0.12 BTU/hr*ft*°F.

22. The pipeline of claim 21 wherein said at least one bituminous composition is at least about ¾ inch thick.

23. The pipeline of claim 21 wherein said at least one bituminous composition is the main contributor to the thermal resistance to heat transfer between said pipe and the environment.

24. The pipeline of claim 21 wherein said composition is adhered directly to said pipe.

25. The pipeline of claim 21 wherein said at least one bituminous composition comprises a plurality of layers.

26. A submarine pipeline coated with multiple layers of fabric, impregnated and covered with a waterproof insulating bituminous composition having thermal conductivity less than 0.12 BTU/hr*ft*°F.

27. A submarine pipeline comprising pipe with at least one bituminous composition therearound, wherein at least one of said at least one bituminous composition is a waterproof insulating composition wherein said at least one bituminous composition contributes more resistance to heat transfer between said pipe and the surroundings than would a coating, wherein said coating is adhered to said pipe, is at least about ¾ inch thick, and has thermal conductivity less than 0.12 BUT/hr*ft*°F.

28. A submarine pipeline comprising pipe with at least one bituminous composition therearound, wherein at least one of said at least one bituminous composition is a waterproof insulating composition, and wherein the thickness of said at least one bituminous composition is more than about ¾ inch.

* * * * *